United States Patent [19]

Tögel et al.

[11] 4,120,218

[45] Oct. 17, 1978

[54] ARRANGEMENT FOR THREADING BOLTS INTO AND OUT OF TAPPED BORES OF REACTOR VESSELS

[75] Inventors: Kurt Tögel, Witten; Hans Warnke, Herne; Horst Westerfeld, Castrop-Rauxel, all of Fed. Rep. of Germany

[73] Assignee: Klöckner-Werke AG, Duisburg, Fed. Rep. of Germany

[21] Appl. No.: 832,071

[22] Filed: Sep. 8, 1977

[30] Foreign Application Priority Data

Sep. 11, 1976 [DE] Fed. Rep. of Germany ....... 2640991

[51] Int. Cl.² ............................................. B25B 29/02
[52] U.S. Cl. ................................................. 81/57.38
[58] Field of Search ....................................... 81/57.38

[56] References Cited

U.S. PATENT DOCUMENTS

| | | | |
|---|---|---|---|
| 3,722,332 | 3/1973 | Jones | 81/57.38 |
| 3,877,326 | 4/1975 | Köck et al. | 81/57.38 |
| 4,027,559 | 6/1977 | Wallrafen | 81/57.38 |
| 4,047,456 | 9/1977 | Scholz | 81/57.38 |

*Primary Examiner*—James L. Jones, Jr.
*Attorney, Agent, or Firm*—Michael J. Striker

[57] ABSTRACT

An arrangement for threading connecting elements, particularly threading bolts equipped with nuts threaded thereon, into and out of tapped bores of a reactor vessel to attach a lid to, and detach the same from the same includes a carrier ring which is supported on the lid during the threading operations, and a bolt-rotating device which is supported on a double-rail track mounted on and extending over the entire circumference of the carrier ring with a spacing therefrom, for displacement in the circumferential direction of the track. A lifting cylinder-and-piston unit is mounted on the carrier ring and tensions the threaded bolt during a part of the threading operations, while the bolt rotating device so acts on the respective bolt during a different part of the threading operations that the bolt is subjected to an axial force which counterbalances the weight of the bolt so that the same can be rotated into or out of the tapped bore with relative ease due to the fact that the frictional forces otherwise attributable to the weight of the bolt are eliminated or at least considerably reduced. The bolt-rotating device includes two coaxial sleeves received one within the other and each having an engaging portion having an aperture of the same shape as an actuating portion of the respective bolt which can thus be received in such apertures and engaged by the coaxial sleeves upon rotation of one of the sleeves relative to the other.

19 Claims, 9 Drawing Figures

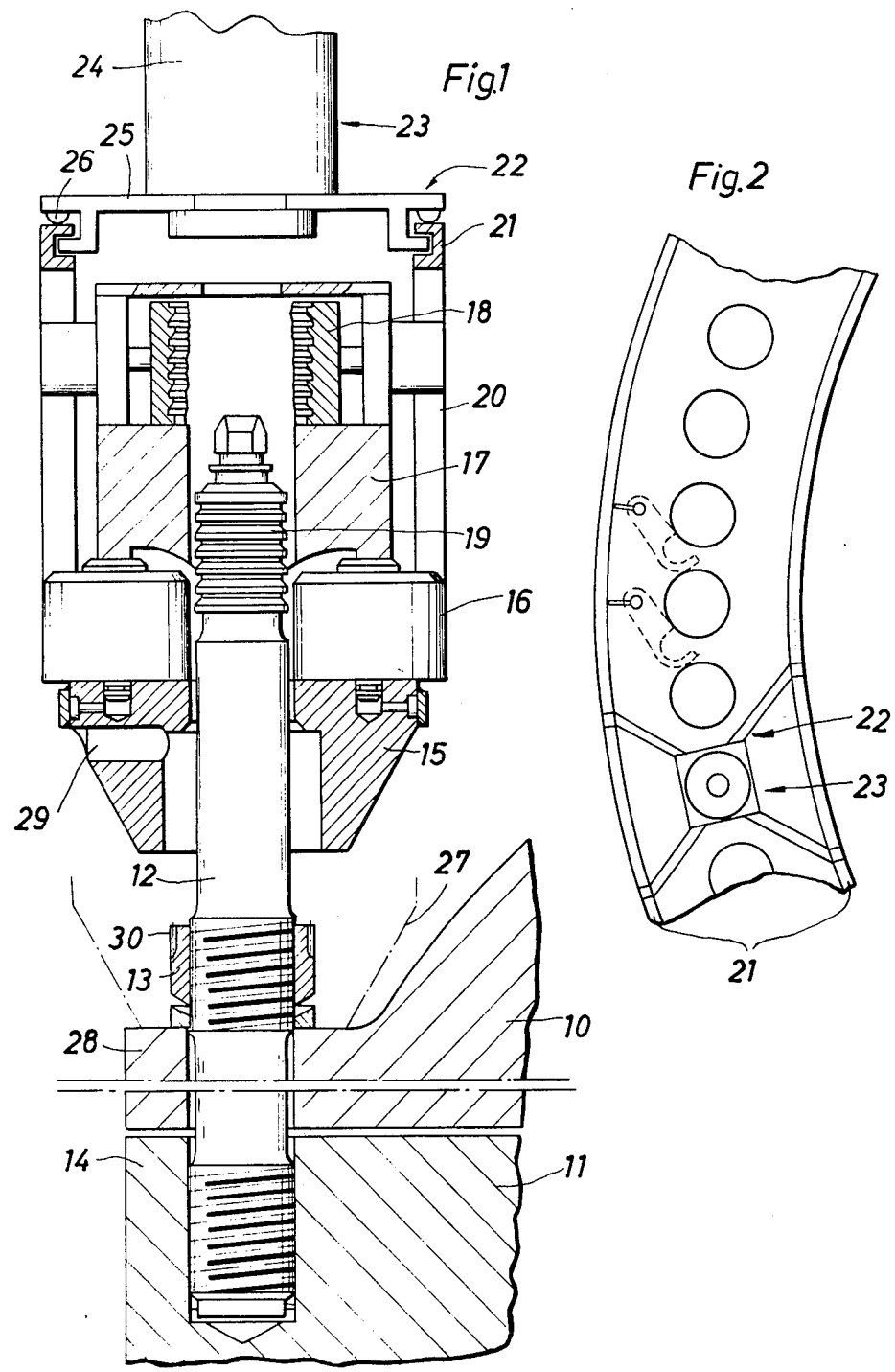

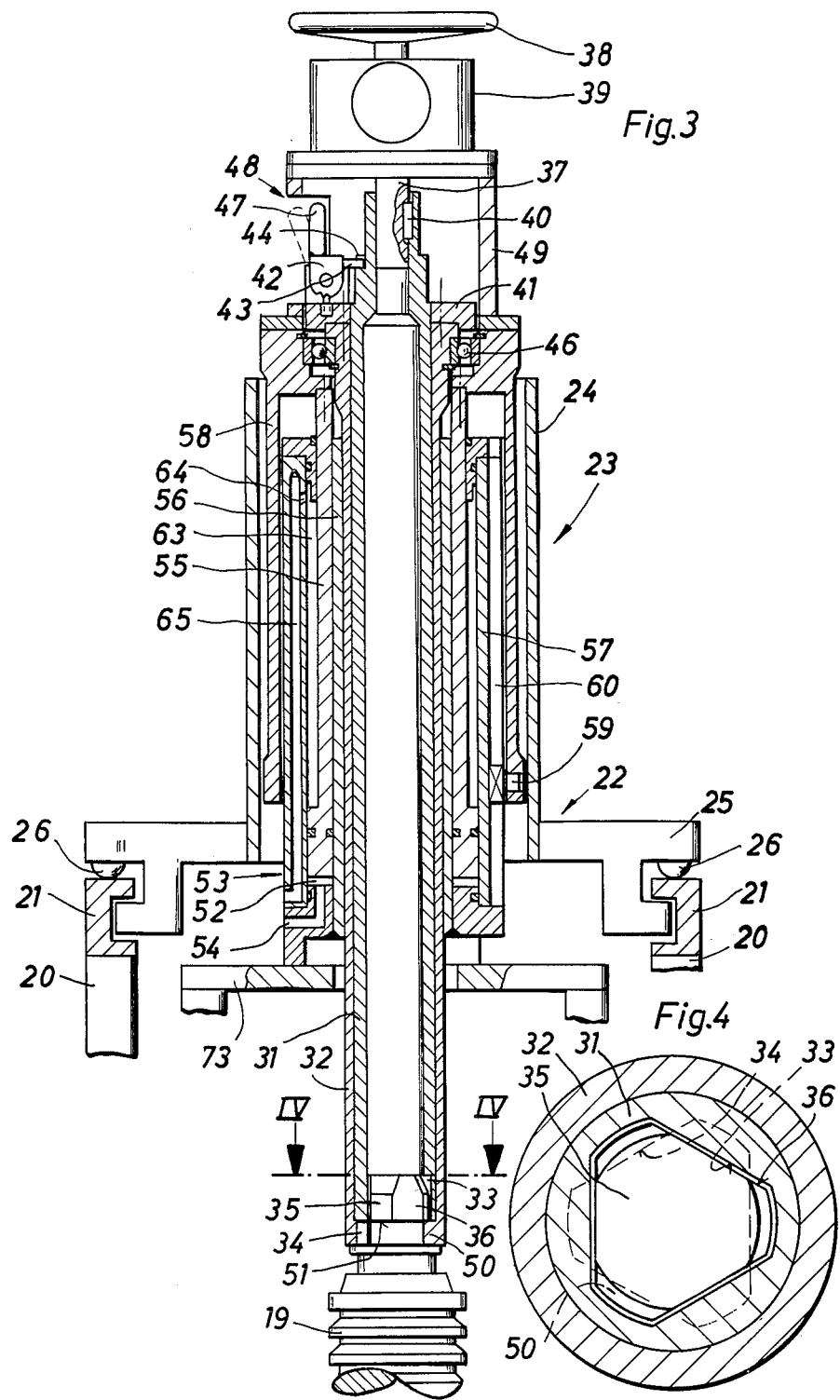

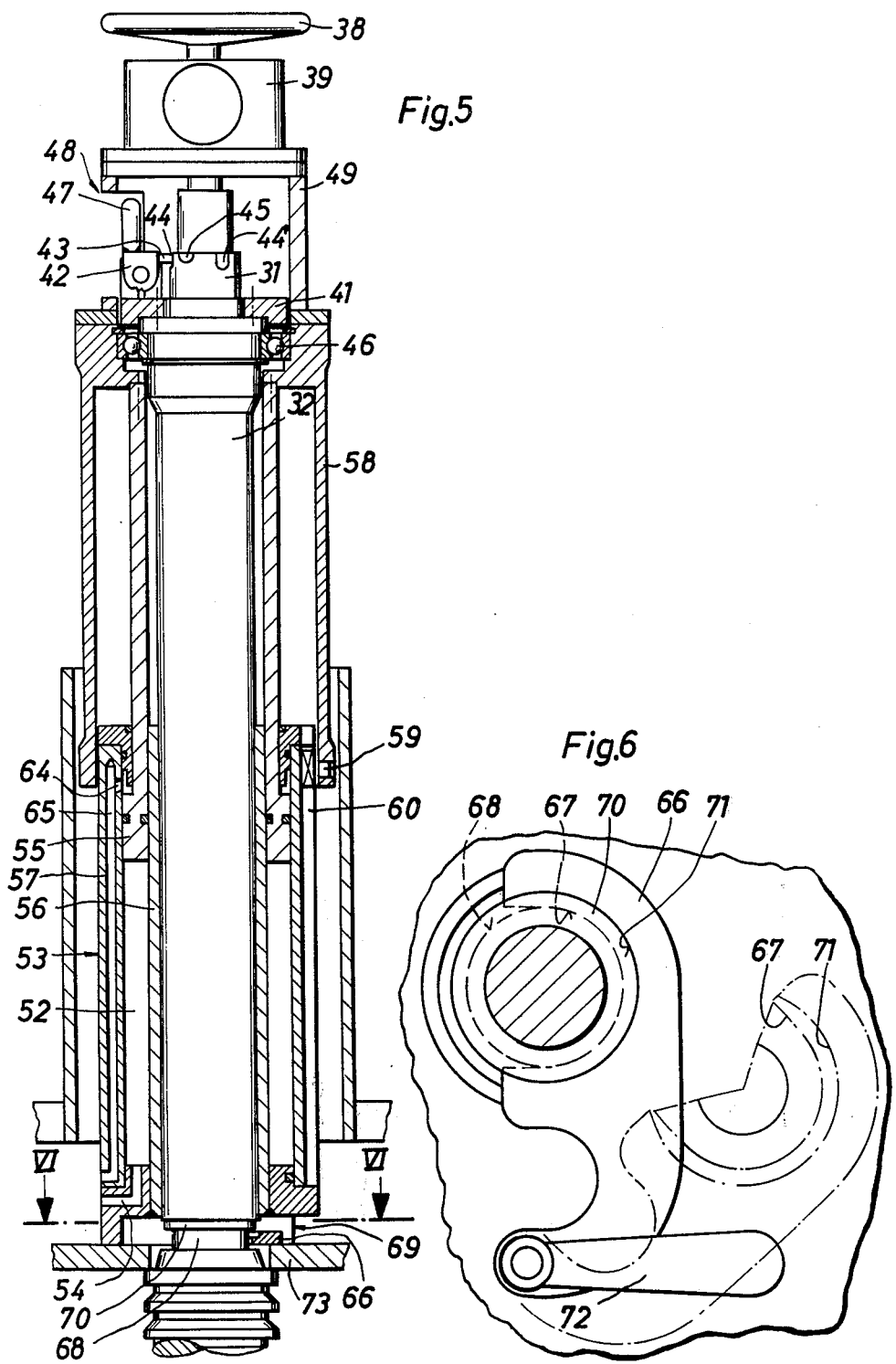

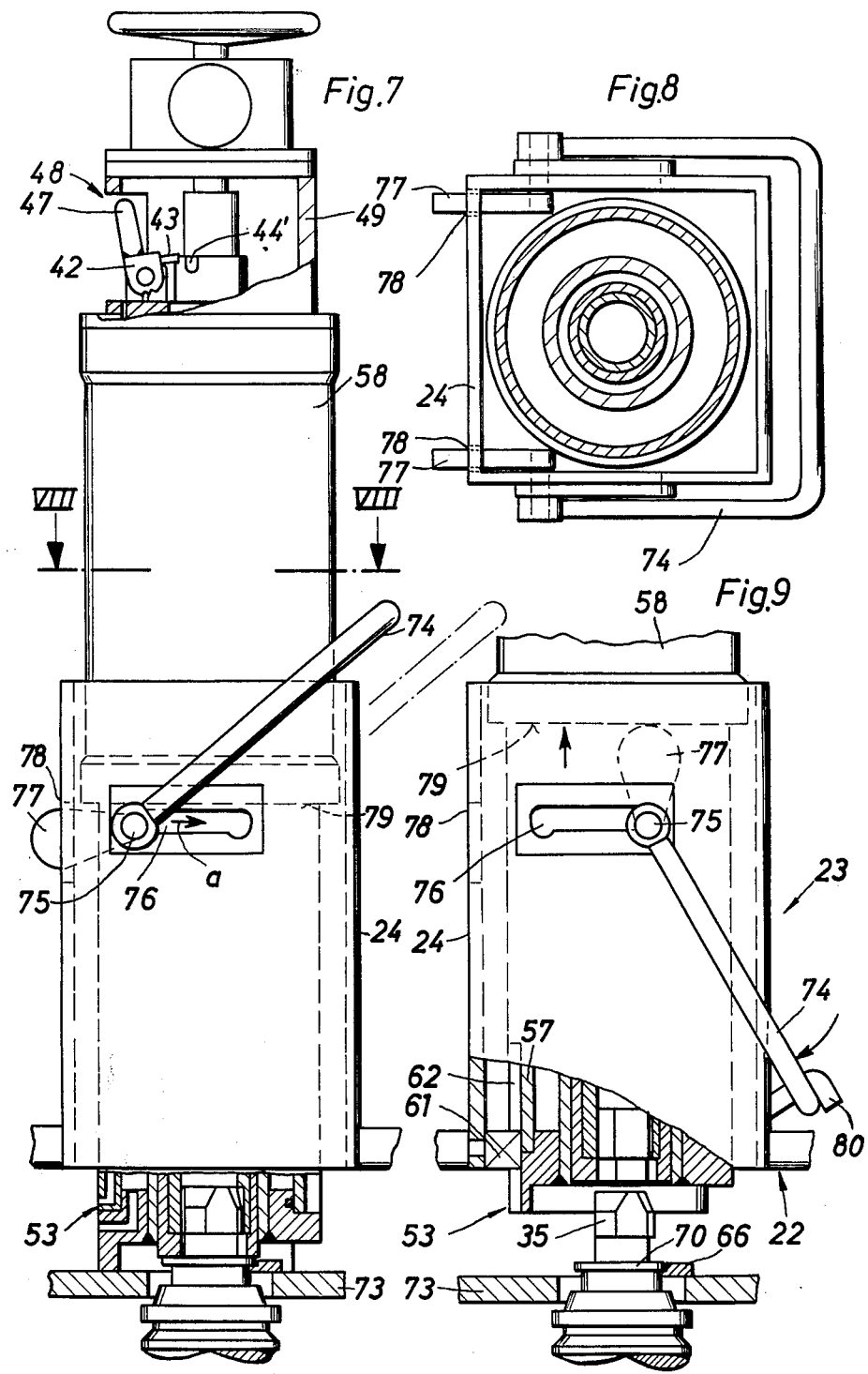

ARRANGEMENT FOR THREADING BOLTS INTO AND OUT OF TAPPED BORES OF REACTOR VESSELS

BACKGROUND OF THE INVENTION

The present invention relates to an arrangement for threading bolts into and out of tapped bores, especially for attaching a lid to and detaching the same from a reactor vessel, such as a nuclear reactor vessel.

When a lid of a reactor vessel is to be attached to or detached from the remainder of the reactor vessel, it is necessary to remove or install the nuts which are threaded on the bolts and together with the latter secure the lid to the vessel proper. Particularly when the reactor vessel is a nuclear reactor vessel of a power plant or the like the removal and installation of the lid would create a health hazard to the operating personnel if they had to be present in the vicinity of the nuclear reactor vessel for the removal or installation of the connecting elements which attach the lid to the remainder of the nuclear reactor vessel. To avoid this danger to the operating personnel, there have been already proposed various devices which are remotely controlled in their operation and which, in sequence, unthread the nuts from the bolts, and thereafter remove the nuts so that the cover can be lifted off the vessel, and which are also capable of performing the above-enumerated operations in the reverse order during the assembly of the lid with the remainder of the vessel.

The arrangements of the above type are satisfactory as far as the avoidance of the health hazard to the operating personnel is concerned. However, it has been found that there are instances where the very presence of the threaded bolts, which continue to project upwardly from the vessel after the nuts have been removed by the remotely controlled arrangement, is disadvantageous. This may, for instance, be the case when the overhead clearance is low and when it is therefore difficult to lift the lid high enough for the bolts to clear the holes provided in the flange of the lid. For this reason it has been proposed not only to remove the nuts, but also to unthread the bolts from the tapped bores in the vessel. This, however, presents special problems because the bolts on a nuclear reactor vessel, in order to be able to withstand the stresses acting thereon, each have a weight of hundreds of pounds. This means that, during the threading of the bolts into or out of the tapped bores in the reactor vessel, a very high frictional resistance is encountered which must be overcome.

To achieve a sequential loosening or even removal of the nuts followed by the removal of the threaded bolts, and the installation of these connecting elements in the reverse order, it has been already proposed, in a copending commonly assigned patent application Ser. No. 792,301, to provide a remotely controlled apparatus including a carrier ring on which there is mounted various equipment which, during the removal of the connecting elements, first tensions the bolts so as to reduce or eliminate the friction between the nut and the lid, then loosens the nut on the threaded bolt, then applies such a force to the bolt as to counteract its own weight, and then unthreads the bolt, together with the nut, from the tapped bore provided in the nuclear reactor vessel proper.

More particularly, the bolt-tensioning device of this copending application is so constructed that it includes a plurality of bolt-carrying units each of which is constituted by a cylinder-and-piston unit, the cylinder of which is rigidly connected to the remainder of the bolt-tensioning device and the piston of which can be detachably connected to the respective threaded bolt. The piston of this unit consists of two coaxial tubes which are shiftable to a limited extent in the axial direction relative to one another, the inner one of these tubes having a multitude of conical bores at its lower end, and a plurality of spheres being respectively accommodated in the bores. On the other hand, the outer one of the tubes has at its lower end a circumferentially complete projection which prevents the spheres from being expelled out of an annular groove of the threaded bolt. To unthread the threaded bolts from the tapped bore of the flange of the vessel, the bolt-tensioning device, which is mounted on a carrier ring, is lowered over the threaded bolts until the carrier ring rests on the flange of the lid. Now, coupling jaws are engaged with corresponding grooves provided at the upper end of the threaded bolt so that afterwards a lifting cylinder-and-piston unit can be energized by a pressurized medium so that the bolt is tensioned and extended. After this extension, the nut threaded on this particular bolt is loosened in that a pinion is introduced through a bore into engagement with the nut and rotates the latter in the required sense. Thereafter, the bolt-tensioning device is lifted and the cylinder-and-piston unit is pressurized so that an upwardly oriented force is exerted on the threaded bolt having such a magnitude as to substantially counteract the weight of the bolt and thus reduce or even eliminate the frictional resistance to the rotation of the bolt in the tapped bore which is attributable to the weight of the bolt. Finally, the threaded bolt is unthreaded from the tapped bore by means of a rotating arrangement which is mounted on a crane, which also carries the bolt-tensioning arrangement, and which revolves the counterbalanced threaded bolt about its axis. As mentioned before, the above-discussed steps are performed in the reverse order during the installation of the lid on the reactor vessel proper.

Experience with this type of an arrangement has shown that, under most circumstances, it performs to satisfaction. However, it has also been established that some problems, mainly concerning the proper alignment of the rotating arrangement with the respective bolt, are still present in this arrangement. Furthermore, this arrangement is not readily capable of removing the nuts alone, or the threaded bolts equipped with such nuts in conjunction with one another.

SUMMARY OF THE INVENTION

Accordingly, it is a general object of the present invention to avoid the disadvantages of the prior art.

More particularly, it is an object of the present invention to provide an arrangement of the type here under consideration which has all the advantages of, but is not possessed of the drawbacks of, the prior-art arrangements of this type.

A further object of the present invention is to improve the construction of the arrangement discussed immediately above as to its construction and its mode of operation.

A concomitant object of the present invention is to provide an arrangement for threading connecting elements into and out of tapped bores of a reactor vessel, which is simple in construction, inexpensive to manufacture and operate, and safe and reliable in operation.

A further object of the present invention is to devise an arrangement of this type which is capable of working in two different modes in one of which it removes just the nuts threaded onto bolts and in the other of which it is capable of removing the bolts together with the nuts threaded thereon, and of reversedly installing the same.

In pursuance of these objects and other which will become apparent hereafter, one feature of the present invention resides, in an arrangement for threading connecting elements, particularly threaded bolts equipped with nuts threaded thereon, into and out of tapped bores, especially to attach a lid to and detach the same from a reactor vessel which, briefly stated, includes a combination that comprises a carrier ring adapted to be supported on the lid during the threading operations; at least one lifting cylinder-and-piston unit mounted on said carrier ring and operative for tensioning a respective threaded bolt during a part of each of said operations; a double-rail track mounted on and extending over the entire circumference of said carrier ring with a spacing therefrom; and at least one bolt-rotating device supported on said track for displacement circumferentially of the same and operative for applying an axial force to the respective threaded bolt which substantially counterbalances the weight of the latter during a different part of each of said operations, and for rotating the respective counterbalanced threaded bolt. In this manner, there is obtained a bolt-tensioning device which fully satisfies the above-mentioned objects, which is safe and simple, and which renders it possible to employ considerable torques for loosening or tightening the connecting elements.

Preferably, the arrangement further comprises means for mounting said track on said carrier ring, which includes a plurality of mutually spaced struts connected to said carrier ring, the track being supported on such struts. The bolt-rotating device preferably includes a carriage which is displaceably mounted on the double-rail track and carries the bolt-counterbalancing and bolt-rotating equipment. Advantageously, the carriage includes a standpipe having an upright axis, a plurality of bracing elements connected to the latter, and a plurality of bearing elements which are interposed between the bracing elements and the track. However, it is also possible and proposed by the present invention to use a single continuous plate carrying the above-mentioned bearing elements, which may be, for instance, balls, instead of the braces. The carriage which is displaceably mounted on the double-rail track renders it possible to displace the bolt-counterbalancing and bolt-rotating equipment to any arbitrary threaded bolt.

It is further proposed, according to an additional feature of the present invention, to construct the bolt-rotating device as a counterbalancing cylinder-and-piston unit accommodated in the standpipe for an adjustment in the vertical position thereof. Then, the counterbalancing unit preferably includes a cylinder consisting of an inner tube and an outer tube coaxially surrounding said inner tube and bounding and interspace therewith, and a piston at least partially received in said interspace. Advantageously, the counterbalancing unit further includes a protective tube connected to the above-mentioned piston and coaxially surrounding the outer tube of the cylinder.

A further proposal of the present invention resides in the fact that the outer tube of the cylinder has an external groove and the counterbalancing unit further includes a guiding element which is internally connected to the protective tube at a lower end thereof and is slidably received in the above-mentioned groove. It is further proposed to provide the outer tube of the cylinder with an external groove, and to equip the counterbalancing unit with a guiding element internally connected to the standpipe at the lower end thereof and slidably received in the above-mentioned groove. The two grooves which have been just mentioned are advantageously independent of one another. The engagement of the two guiding elements with their respective grooves secures the cylinder-and-piston unit against internal angular displacement of the components thereof, and also against the angular displacement with respect to the standpipe.

According to the invention, a further feature resides in the fact that the counterbalancing unit further includes two coaxial sleeves at least partly accommodated in the inner tube of the cylinder and received one within the other for an adjustment in the vertical positions thereof and for turning relative to one another about their common axis. Preferably, the coaxial sleeves have respective end portions adapted to engage a respective actuating portion of the respective threaded bolt and having respective apertures which substantially conform in shape to the acutating portion of the threaded bolt for the latter to be introducible into the respective apertures for an engagement by the above-mentioned end portions. Advantageously, the above-mentioned shape is generally triangular. However, this shape could also be, for instance, approximately square or hexagonal both for the actuating portion of the threaded bolt and for the corresponding apertures of the engaging portions of the sleeves.

According to a further currently preferred aspect of the present invention, the bolt-rotating device further includes means for turning the coaxial sleeves relative to one another, including a handwheel and a transmission interposed between the latter and the coaxial sleeves. In addition thereto, the bolt-rotating device advantageously further includes means for arresting the coaxial sleeves in at least one predetermined turned position relative to each other, such arresting means includes at least one recess in the inner one of said coaxial sleeves, and a lever pivotally mounted on the outer one of said coaxial sleeves and having an arresting portion received in said recess in said predetermined turned position of said coaxial sleeves. Furthermore, the bolt-rotating device preferably also includes means for turning both of the coaxial sleeves in unison, such as a motor, preferably an electromotor, the joint turning of the coaxial sleeves resulting in unthreading or threading the bolt out of or into the tapped bore of the flange of the reactor vessel. Furthermore, there may be provided locking means which includes a locking element which embraces the respective threaded bolt at a recessed region of the latter. The provision of the locking means assures a reliable transportation of the threaded bolt.

In addition thereto, according to a further concept of the present invention, the standpipe is provided with elongated slots, and a generally U-shaped bracket is displaceably received in the elongated slots and embraces the standpipe. The standpipe of this type has openings therein, and a pair of eccentrics is mounted on the above-mentioned bracket and they extend into the openings of the standpipe. In this manner, it is achieved that the bolt-tensioning and bolt-rotating equipment can clear the head of the bolt and be displaced on the double-rail track toward the next following threaded bolt to be either unthreaded or threaded into the respective tapped bore.

The novel features which are considered as characteristic for the invention are set forth in particular in the appended claims. The invention itself, however, both as to its construction and its method of operation, together with additional objects and advantages thereof, will be best understood from the following description of specific embodiments when read in connectin with the accompanying drawing.

BRIEF DESCRIPTION OF THE DRAWINGS

FIG. 1 is a partly sectioned side elevational view of the arrangement of the present invention as located around the respective bolt but upwardly spaced from the flange of the lid;

FIG. 2 is a somewhat diagrammatic fragmentary top plan view of the double-rail track of the present invention;

FIG. 3 is a sectional view, at an enlarged scale, of the bolt-counterbalancing and bolt-rotating device of the present invention;

FIG. 4 is a section taken on the line IV—IV of FIG. 3 at a still enlarged scale;

FIG. 5 is a view similar to FIG. 3 but with the respective bolt unthreaded from the respective tapped bore;

FIG. 6 is a sectional view taken on the line VI—VI of FIG. 5, at a still enlarged scale;

FIG. 7 is a partially sectioned view of the bolt-counteracting and bolt-rotating device of the present invention;

FIG. 8 is a sectional view taken on the line VIII—VIII of FIG. 7; and

FIG. 9 is a side elevational view of a fragment of FIG. 7 in a lifted position relative to that illustrated in FIG. 7.

DETAILED DISCUSSION OF THE PREFERRED EMBODIMENTS

Referring now to the drawing in detail, and first to FIG. 1 thereof, it will be appreciated that the bolt-tensioning arrangement of the present invention serves to open and close the lid or cover 10 of a reactor vessel 11 by means of threading a threaded bolt 12 with a corresponding nut 13 out of or into a tapped bore provided in a flange 14 of the reactor vessel 11. The arrangement of the present invention includes a carrier ring 15 on which there are mounted lifting cylinder-and-postion units 16 which, when acted upon by a pressurized medium, extend the respective threaded bolt 12 by means of pressure bridges 17 and of the coupling jaws 18 which are positively connected to the upper end 19 of the threaded bolt 12 under these circumstances.

Furthermore, there are provided on the carrier ring 15, at a spacing from one another, struts 20, and a double-rail track 21 extending over the entire circumference of the carrier ring 15 is supported on these struts 20. At least one carriage 22 equipped with a bolt-counterbalancing and bolt-rotating device 23 is supported on the double-rail track 21 for displacement over the entire circumference of the track 21, as will appear from the comparison of FIGS. 1 and 2. The carriage 22 consists of a standpipe 24 equipped with braces 25 which are rigidly connected thereto, spherical elements or balls 26 being mounted on the respective braces 25.

Having so discussed the basic arrangement of the present invention, the details of the same will become apparent during the following discussion of the operation of the arrangement.

When it is desired to open the lid 10, that is, to remove it from the reactor vessel 11, the bolt-tensioning arrangement is so suspended over the respective threaded bolts 12 as it appears from FIG. 1. The bolt-tensioning arrangement, under these circumstances, is yet not supplied with a pressurized medium. Subsequently thereto, the bolt-tensioning arrangement is further lowered until the carrier ring 15 rests on a flange 28 of the lid 10, as indicated in dash-dotted contour identified in FIG. 1 with the reference numeral 27. In this condition, the carrier ring 15 and thus the entire bolt-tensioning arrangement is supported on the flange 28 of the lid 10.

After the bolt-tensioning arrangement has assumed the above-discussed lowered position, the coupling jaws 18 are engaged in the corresponding grooves provided in the upper end 19 of the threaded bolt 12 so that, when the cylinder-and-piston unit 16 is subsequently supplied with a pressurized medium, the coupling jaws 18 pull the end 19 of the threaded bolt 12 upwardly and thus tension and extend at least that portion of the bolt 12 which projects out of the tapped bore provided in the flange 14 of the reactor vessel 11. When the threaded bolt 12 is extended to the desired extent, the nut 13, which is now being pressed, together with a washer located underneath the same, against the upper surface of the flange 28 of the lid 10 with a much lower force than when the threaded bolt 12 is not tensioned and thus offers a much lower resistance to the turning thereof, is rotated in the desired direction in that a pinion or the like is introduced into a bore 29 of the carrier ring 15 and engaged with an external gear portion 30 of the nut 13. Subsequently to the loosening of the nut 13, the action of the cylinder-and-piston units 16 is discontinued, the jaws 18 withdrawn from their engagement with the end 19 of the threaded bolt 12, and the bolt-tensioning arrangement is returned into its position illustrated in FIG. 1.

Now, the carriage 22 with the bolt-counterbalancing and bolt-rotating device 23, which has assumed an arbitrary rest position on the double-rail track 21, is so displaced by means of the bolts 26 that the middle axis of two coaxial sleeves (an inner sleeve 31 and an outer sleeve 32 both illustrated, for instance, in FIG. 3) coincides with the longitudinal axis of the threaded bolt 12. The sleeves 31 and 32 are accommodated within a cylinder-and-piston unit, which will be described later on, for adjustment in their vertical positions and for turning relative to one another.

The two coaxial sleeves, that is, the inner sleeve 31 and the outer sleeve 32, are provided, at their respective ends which extend toward the threaded bolt 12 in the above-discussed aligned position, with apertures 33 and 34 which can be slid over an actuating portion 35 of the threaded bolt 12, the latter being provided with three surfaces 36 which are distributed at 120° about the longitudinal axis of the bolt 12. The apertures 33 and 34 have approximately triangular cross sections of the same shape as the cross section of the actuating portion 35 of the threaded bolt 12.

The inner sleeve 31 is connected, at its end which faces away from the bolt 12, with a stub shaft 37 which, in turn, is connected to a handwheel 38 and a drive 39, such as an electromotor. The connection is accomplished by means of a key 40 which is fittingly received in a groove, but it can be also accomplished by means of interengaging teeth, corrugations or in any other conventional manner. A flange 41 is connected with the outer sleeve 32, and a pivotable lever 42 of a rectangular outline is pivotably mounted on the flange 41. The lever 42 has a lever arm 43 which, as particularly illustrated in FIG. 5, is capable of being arrestingly received either in one of deep recesses 44, 44', or in a shallow recess 45 of the inner sleeve 31.

Now, when the inner sleeve 31 together with the outer sleeve 32 are to be slid over the actuating portion 35 of the bolt 12, the inner sleeve 31 is turned, by means of the handwheel 38, until the lever arm 43 engages in the shallow recess 45 so that the inner sleeve 31 is so turned through 60° relative to the outer sleeve 32 that the apertures 33 and 34 are located congruently above one another. Now, the inner sleeve 31 and the outer sleeve 32, which are mounted by a ball bearing 46 for joint turning and are coupled to one another by means of the lever 42, are jointly turned by the handwheel 38 through such an angle and until the apertures 33 and 34 come into conforming registry with the actuating portion 35 of the bolt 12, in which position they can be jointly slid over the actuating portion 35. A facilitation of this procedure is obtained as a result of the fact that, due to the engagement of the lever arm 43 in the shallow recess 45, the lever 42 assumes an inclined position, as illustrated in FIG. 3 in dash-dotted lines and also in FIG. 7. In this position, a handgrip arm 47 of the lever 42 is received in an opening 42 of a bracket 49.

The opening 48 of the bracket 49 has such dimensions, extending over an angle greater than 120°, that the proper position of the inner sleeve 31 and the outer sleeve 32 can be found by a joint swiveling of this lever arm 47 within the opening 48, so that the congruently superimposed apertures 33 and 34 of the sleeves 31 and 32 assume the orientation compatible with that of the actuating portion 35 of the bolt 12. After the lower ends of the sleeves 31 and 32 have been slid over the actuating portion 35, the sleeves 31 and 32 are turned relative to one another by means of the handwheel 38 by 60°, until the lever arm 43 is arrestingly received in one of the deep recesses 44 or 44'. As a result of the relative turning of the two sleeves 31 and 32, a shoulder 50 of the outer sleeve 32 engages a shoulder 51 of the actuating portion 35 of the bolt 12 from below, as seen particularly in FIGS. 3 and 4. In this condition, the threaded bolt 12 is affixed to the inner and outer sleeves 31 and 32.

The threading of the threaded bolt 12 into or out of the threaded bore of the flange 14 of the reactor vessel 11 is accomplished by resorting to the use of the drive 39 which sets the inner sleeve 31 and the outer sleeve 32 with the flange 31 and the lever 42 into joint motion with one another and with the threaded bolt 12.

At least during this joint turning, a pressurized medium derived from a conventional source of such medium is admitted into a chamber 52 of a cylinder 53 through a pressure conduit 54 so that a piston 55 is acted upon by the pressurized medium in the upward direction and exerts an upwardly oriented force on the threaded bolt 12. The pressure of the pressurized medium is so selected that the above-mentioned force counteracts the weight of the threaded bolt 12, preferably to the full extent of the weight so that the threaded bolt 12, instead of being supported on the threads of the tapped bore in the flange 14 of the reactor vessel 11 is suspended on the pressurized medium present in the chamber 52. As a result of this, frictional forces attributable to the weight of the bolt 12, which would otherwise oppose the rotation of the threaded bolt into or out of the tapped bore in the flange 14, are reduced or fully eliminated.

The cylinder 53 consists of an inner tube 56 and an outer tube 57 which coaxially surrounds the inner tube 56 and bounds the chamber 52 therewith, and the piston 55 is tubular and is partially received in between the tubes 56 and 57 of the cylinder 53. The piston 55 is connected with a coaxial protective tube 58 which surrounds the outer tube 57 of the cylinder 53. A guiding element 59 is attached to the lower end of the protective tube 58 inwardly thereof and is slidably received in a guiding groove 60 of the cylinder 53. In this manner, the cylinder 53, on the one hand, and the piston 55 with its protective tube 58, on the other hand, are prevented from mutual angular displacement relative to one another.

A guiding element 61 is stationarily mounted within the standpipe 24 at the lower end thereof, and is received, as particularly seen in FIG. 9, in a groove 62 of the cylinder 53 for sliding therein. In this manner, the cylinder-and-piston unit 53, 55 and the standpipe 24 are prevented from performing relative angular displacements with respect to one another.

The medium which is present in a cylinder space 63 can escape, during the admission of the pressurized medium to the piston 55, through a bore 64 and through a duct 65. Now, when the threaded bolt is lifted to the extent apparent from FIG. 5, a locking element 66 is so shifted from its initial position which is illustrated in dash-dotted lines in FIG. 6, that a recess 67 embraces the bolt 12 in the region of its depression 68. To render this possible, an opening 69 is provided in the cylinder 53.

When this happens, the threaded bolt 12 is lowered, by closing the pressure conduit 54, to such an extent that its shoulder 70 comes to rest in a depression 71 of the locking element 66, and the locking element 66 is arrested in its position by an arresting lever 77. The depression 71 extends over an angle greater than 180° so that the threaded bolt 12 is secured against sliding out.

In the further succession, the connection between the actuating portion 35 of the threaded bolt 12 and the sleeves 31 and 32 is discontinued in a reverse succession than explained above and afterwards the threaded bolt 12 is securely suspended from a carrier plate 73.

The standpipe 24, as illustrated in FIG. 7, has a quadratic cross section and is embraced, from the outside, by a U-shaped bracket 74 which is shiftably supported in elongated slots 76 with bolts 75. Eccentrics 77 are also pivoted on the bolts 75 and extend through openings 78 of the standpipe 24. Now, when the bracket 74 with the eccentrics 77 is shifted in the direction of the arrow $a$, the eccentrics 77 come into abutment underneath a shoulder 79 of the protective sleeve 58.

When the bracket 74 is pressed downwardly as illustrated in FIG. 9, the eccentrics 77 which engage the shoulder 79 of the protective sleeve 58 lift, within the confines of the standpipe 24, the cylinder-and-piston unit 53, 55 and also the inner and outer sleeves 31 and 32 away from the carrier plate 73. The bracket 74 is arrested in this position by means of a hook 80.

As also illustrated in FIG. 9 the carriage 22 with the bolt-counterbalancing and bolt-rotating device 23 is now free for displacement upwardly of the actuating portion 35 of the bolt 12 and circumferentially of the double-rail track 21 to the next threaded bolt 12 which is to be threaded in or out of the next succeeding tapped bore in the flange 14 of the reactor vessel 11.

It will be understood that each of the elements described above, or two or more together, may also find a useful application in other types of constructions differing from the types described above.

While the invention has been illustrated and described as embodied in an arrangement for threading connecting elements into and out of tapped bores of reactor vessels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for threading connecting elements, particularly threaded bolts equipped with nuts threaded thereon, into and out of tapped bores especially to attach a lid to and detach the same from a reactor vessel, a combination comprising a carrier ring adapted to be supported on the lid during the threading operations; at least one lifting cylinder-and-piston unit mounted on said carrier ring and operative for tensioning a respective threaded bolt during a part of each of said operations; a double-rail track mounted on and extending over the entire circumference of said carrier ring with a spacing therefrom; and at least one bolt-rotating device supported on said track for displacement circumferentially of the same and operative for applying an axial force to the respective threaded bolt which substantially counterbalances the weight of the latter during a different part of each of said operations, and for rotating the respective counterbalanced threaded bolt.

2. A combination as defined in claim 1; and further comprising means for mounting said track on said carrier ring, including a plurality of mutually spaced struts connected to said carrier ring.

3. A combination as defined in claim 1, wherein said bolt-rotating device includes a carriage which includes a standpipe having an upright axis, a plurality of bracing elements connected to the latter, and a plurality of bearing elements interposed between said bracing elements and said track.

4. A combination as defined in claim 3, wherein said bearing elements are balls which are mounted on said bracing elements.

5. A combination as defined in claim 3, wherein said bolt-rotating device further includes a counterbalancing cylinder-and-piston unit accommodated in said standpipe for an adjustment in the vertical position thereof.

6. A combination as defined in claim 5, wherein said counterbalancing unit includes a cylinder consisting of an inner tube and an outer tube coaxially surrounding said inner tube and bounding an interspace therewith, and a piston at least partially received in said interspace.

7. A combination as defined in claim 6, wherein said counterbalancing unit further includes a protective tube connected to said piston and coaxially surrounding said outer tube of said cylinder.

8. A combination as defined in claim 7, wherein said outer tube of said cylinder has an external groove; and wherein said counterbalancing unit further includes a guiding element internally connected to said protective tube at a lower end thereof and slidably received in said groove.

9. A combination as defined in claim 6, wherein said outer tube of said cylinder has an external groove; and wherein said counterbalancing unit further includes a guiding element internally connected to said standpipe at a lower end thereof and slidably received in said groove.

10. A combination as defined in claim 6, wherein said counterbalancing unit further includes two coaxial sleeves at least partly accommodated in said inner tube of said cylinder and recieved one within the other for an adjustment in the vertical positions thereof and for turning relative to one another about their common axis.

11. A combination as defined in claim 10, wherein said coaxial sleeves have respective end portions adapted to engage a respective actuating portion of the respective threaded bolt and having respective apertures which substantially conform in shape to the actuating portion of the threaded bolt for the latter to be introducible into said respective apertures for an engagement by said end portions.

12. A combination as defined in claim 11, wherein said shape is generally triangular.

13. A combination as defined in claim 10, wherein said bolt-rotating device further includes means for turning said coaxial sleeves relative to one another, including a handwheel and a transmission interposed between the latter and said coaxial sleeves.

14. A combination as defined in claim 10, wherein said bolt-rotating device further includes means for arresting said coaxial sleeves in at least one predetermined turned position relative to each other, including at least one recess in the inner one of said coaxial sleeves, and a lever pivotally mounted on the outer one of said coaxial sleeves and having an arresting portion received in said recess in said predetermined turned position of said coaxial sleeves.

15. A combination as defined in claim 10, wherein said bolt-rotating device further includes means for turning both of said coaxial sleeves in unison.

16. A combination as defined in claim 15, wherein said turning means includes a motor.

17. A combination as defined in claim 3, wherein said standpipe has elongated slots; and further comprising a generally U-shaped bracket which is displaceably received in said elongated slots and embraces said standpipe.

18. A combination as defined in claim 17, wherein said standpipe has openings therein; and further comprising a pair of eccentrics which are mounted on said bracket and extend into said openings of said standpipe.

19. A combination as defined in claim 1; and further comprising locking means including a locking element which embraces the respective threaded bolt at a recessed region of the latter.

* * * * *